(12) United States Patent
Zimmer et al.

(10) Patent No.: US 9,127,493 B2
(45) Date of Patent: Sep. 8, 2015

(54) PNEUMATIC DECELERATION ARRANGEMENT WITH CONSTANT PERFORMANCE

(71) Applicants: Guenther Zimmer, Rheinau (DE); Martin Zimmer, Rheinau (DE)

(72) Inventors: Guenther Zimmer, Rheinau (DE); Martin Zimmer, Rheinau (DE)

( * ) Notice: Subject to any disclaimer, the term of this patent is extended or adjusted under 35 U.S.C. 154(b) by 0 days.

(21) Appl. No.: 13/716,157

(22) Filed: Dec. 16, 2012

(65) Prior Publication Data

US 2013/0118846 A1 May 16, 2013

Related U.S. Application Data

(63) Continuation-in-part of application No. PCT/DE2011/001356, filed on Jun. 22, 2011.

(30) Foreign Application Priority Data

Jun. 24, 2010 (DE) .................... 10 2010 024 994.7

(51) Int. Cl.
| | |
|---|---|
| *F16F 9/50* | (2006.01) |
| *E05F 3/02* | (2006.01) |
| *F16F 9/02* | (2006.01) |
| *F16F 9/32* | (2006.01) |
| *F16F 9/43* | (2006.01) |

(52) U.S. Cl.
CPC ............... *E05F 3/02* (2013.01); *F16F 9/0218* (2013.01); *F16F 9/3221* (2013.01); *F16F 9/432* (2013.01)

(58) Field of Classification Search
CPC ......... E05F 3/02; F16F 9/0218; F16F 9/3221; F16F 9/432
USPC ........... 188/281, 282.3, 282.6, 284, 286–289, 188/316, 318, 322.15, 322.16, 322.17, 188/322.22, 321.11; 267/64.11, 64.14, 267/64.15
See application file for complete search history.

(56) References Cited

U.S. PATENT DOCUMENTS

| | | | | |
|---|---|---|---|---|
| 4,044,866 A | * | 8/1977 | Ishida | 188/322.21 |
| 4,045,008 A | * | 8/1977 | Bauer | 267/120 |
| 4,595,182 A | * | 6/1986 | Freitag et al. | 267/120 |
| 4,683,992 A | * | 8/1987 | Watanabe | 188/266.5 |
| 4,946,143 A | * | 8/1990 | Bauer et al. | 267/64.11 |
| 5,131,615 A | * | 7/1992 | Hosan et al. | 248/161 |
| 8,348,028 B2 | * | 1/2013 | Zimmer et al. | 188/288 |

FOREIGN PATENT DOCUMENTS

| | | |
|---|---|---|
| DE | 1 932 797 | 2/1966 |
| DE | 44 42 547 | 6/1996 |
| DE | 103 36 060 | 3/2004 |
| DE | 103 13 659 | 9/2004 |
| DE | 201 22 569 | 6/2006 |
| EP | 0 291 469 | 4/1988 |
| EP | 0 343 335 | 11/1989 |
| GB | 1 455 803 | 11/1976 |

* cited by examiner

*Primary Examiner* — Pamela Rodriguez
(74) *Attorney, Agent, or Firm* — Klaus J. Bach

(57) ABSTRACT

In a pneumatic deceleration device comprising a cylinder with a piston movably guided therein by a piston rod and having at least one sealing element, with a displacement space and a compensation chamber disposed at opposite sides of the sealed piston, where a piston movement opposing force is generated by a pressure in the displacement space and a vacuum generated in the compensation chamber, a pneumatic connection is formed from the displacement space and the compensation chamber to the ambient when the piston is in its end position where the displacement space is at its maximum value.

6 Claims, 2 Drawing Sheets

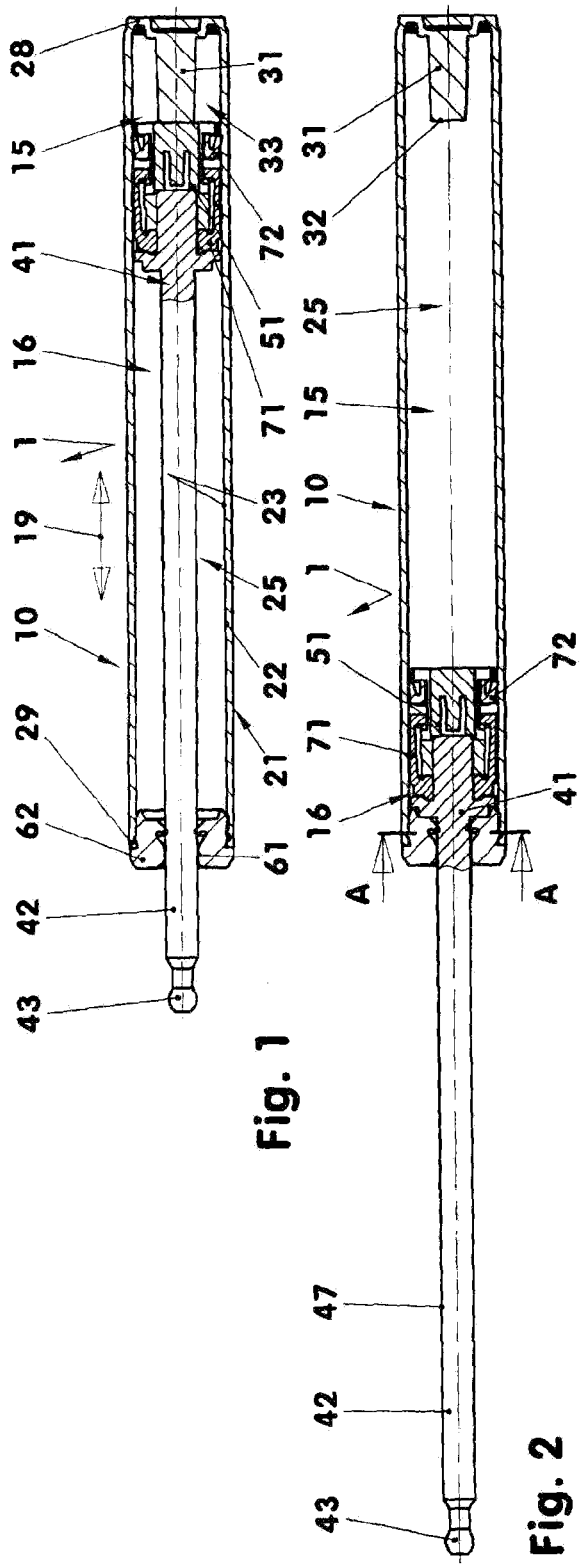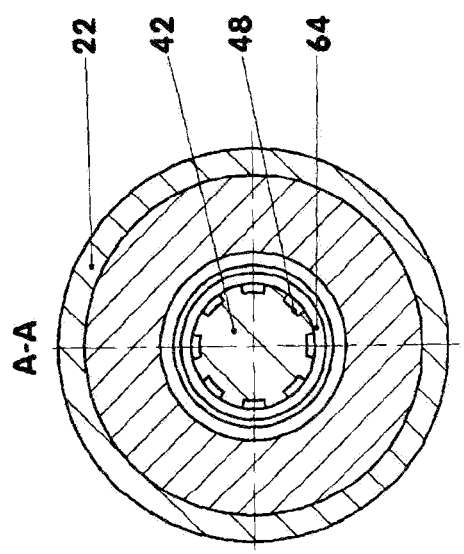

PNEUMATIC DECELERATION ARRANGEMENT WITH CONSTANT PERFORMANCE

This is a Continuation-In-Part application of pending international patent application PCT/DE2011/001356 filed Jun. 22, 2011 and claiming the priority of German patent application 10 2010 024 994.7 filed Jun. 24, 2010.

BACKGROUND OF THE INVENTION

The invention resides in a pneumatic deceleration arrangement including a cylinder in which a piston with a piston rod is movably supported and which is provided with at least one piston seal element to delimit a displacement chamber from a compensation chamber wherein, by a pressure in the displacement chamber and a vacuum in the compensation chamber, a force is generated by a stroke movement of the piston which is opposite to the direction of movement of the piston.

DE 103 13 659 A1 discloses such a retardation arrangement. However, the forces generated during the deceleration in such an arrangement may vary upon repeated actuation over a large range.

It is the object of the present invention to provide a pneumatic deceleration arrangement which has only a small variation range of deceleration forces.

SUMMARY OF THE INVENTION

In a pneumatic deceleration device comprising a cylinder with a piston movably guided therein by a piston rod and having at least one sealing element, with a displacement space and a compensation chamber disposed at opposite sides of the sealed piston, wherein a piston movement opposing force is generated by a pressure in the displacement space and a vacuum generated in the compensation chamber, a pneumatic connection is established from the displacement space and the compensation chamber to the ambient when the piston is in its end position where the displacement space is at its maximum value. As a result, in a state of rest, the cylinder interior is at ambient pressure, so that operation of the deceleration device always start out from a fixed operating point and at rest, no part of the device is pressurized.

The invention will become more readily apparent from the following description of a particular embodiment thereof presented below with reference to the accompanying drawings.

BRIEF DESCRIPTION OF THE DRAWINGS

FIG. 1 shows a longitudinal cross-sectional view of a retardation arrangement according to the invention with the piston rod inserted, FIG. 2 is a longitudinal cross-sectional view of the retardation arrangement with the piston rod extended.

FIG. 3 shows in a transverse cross-sectional view the piston rod and the piston rod seal.

DESCRIPTION OF A PARTICULAR EMBODIMENTS

Figure 4:
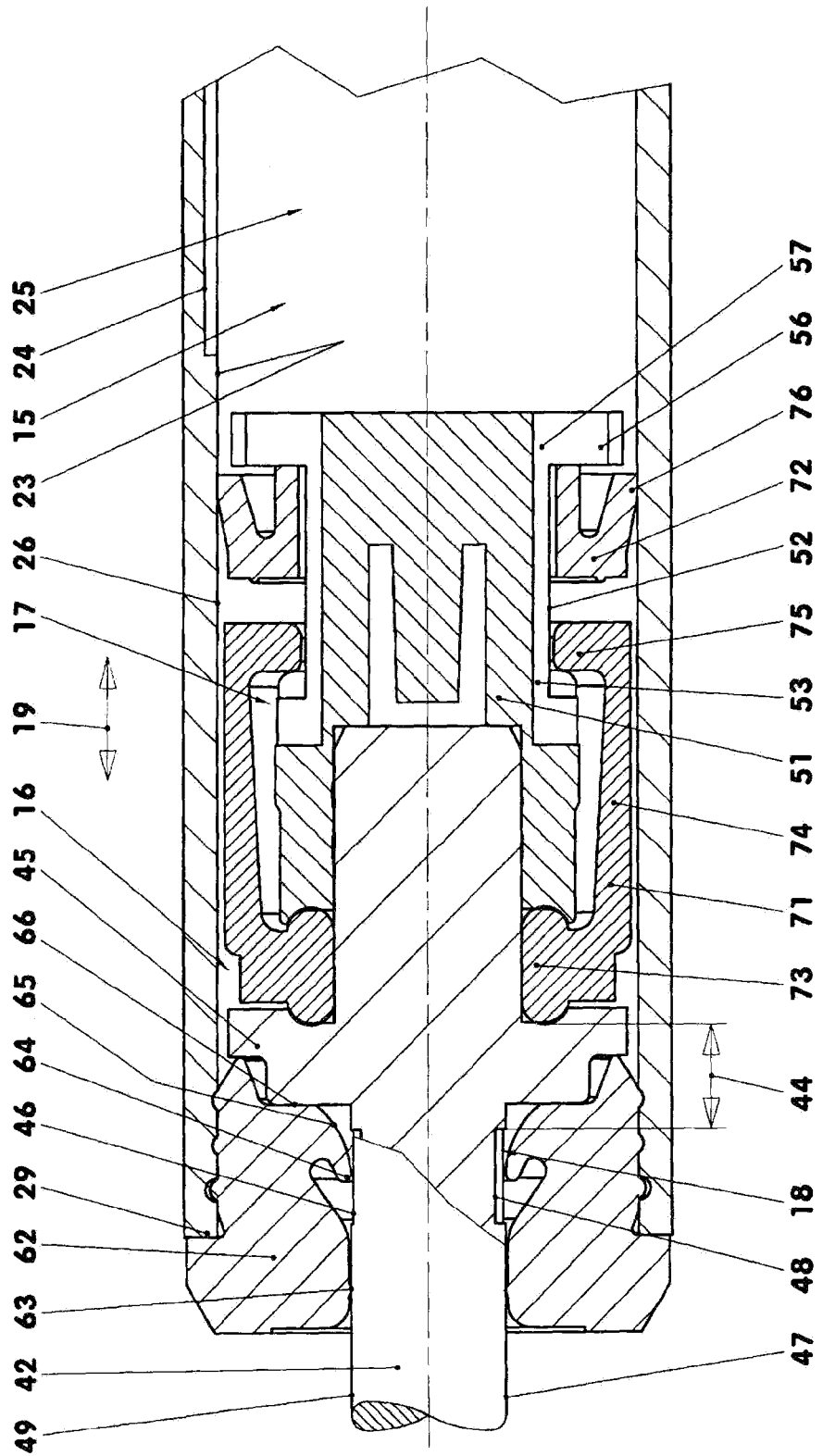
FIG. 4 shows enlarged in detail the cylinder head area of FIG. 2.

FIGS. 1-4 show a deceleration device (10) which is used for example in a guide system which is not shown in the drawings. This guide system guides and supports for example a drawer of a furniture piece. It comprises, in addition to the deceleration device 10 for example a pull-back arrangement. For example when the drawer has moved close to its closed end position, the deceleration device 10 which is mounted to the drawer, engages a catcher which is firmly mounted to the furniture piece. The stroke movement of the drawer relative to the furniture piece is then retarded thereby. At the same time, or after movement of the drawer over another partial stroke toward its end position, the pull-back arrangement is triggered by the drawer. The pull-back arrangement acts against the effect of the deceleration device 10 and pulls the drawer for example into its closed end position. The deceleration arrangement 10 remains in engagement with the catcher until it reaches its end position. Also, the use of a pneumatic deceleration device 10 without a final draw-in device is possible.

The deceleration device 10 comprises a cylinder 21 in which a piston unit 41 consisting of a piston 51 and a piston rod 42 is guided. The piston 51 is provided with two piston sealing elements 11, 72. The piston rod head 43 of the essentially cylindrical piston rod 42 is in this embodiment in the form of a ball head 43. This ball head 43 can be engaged by a carrier element, a stop plate etc.

The cylinder 21 comprises a pot-shaped cylinder housing 22 with an integrated cylinder end wall 28 and a head section 29 which is closed by a piston rod seal 62. It consists for example of an injection molded component of a thermoplastic material for example polyoximethylene. The cylinder housing 22 has a cylindrical outer surface. Its length is for example five and a half times its diameter. The non-cylindrical inner cylinder wall 23 is for example in the form of a truncated cone. The larger cross-sectional area of this truncated cone-shaped housing is disposed at the head section 29 of the cylinder 21, the smaller cross-sectional area is at the cylinder bottom end 28. The first-mentioned cross-sectional area is for example 63 mm$^2$. The inclination of this deformation cone is for example 1:65. The inner wall 23 is possibly polished. The minimum wall thickness of the cylinder housing 22 is for example 7% of its outer diameter.

On the cylinder bottom end wall 28, a truncated cone-shaped projection 31 with an abutment front end face 32 is disposed so as to project into the inner cylinder space 25. It delimits, together with the internal wall, an annular chamber 33. The cross-sectional area of the annular chamber 33 is 80% of the larger cross-sectional area of the truncated cone housing. Its length is for example one seventh of the piston stroke. However, the cylinder 21 may also be without the projection 31.

The inner cylinder wall 23 is provided with an axial groove 24, see FIG. 4. Its length is for example 60% of the length of the cylinder and ends—depending on the embodiment of the cylinder 21 in the plane of the front end face 32 of the projection 31, or at the cylinder bottom wall 28. Its width is for example 2% of the larger diameter of the inner cylinder wall 23. The depth of the groove 24 is in the present exemplary embodiment one fourth of its width. The groove 24 has sharp edges at the inner cylinder wall 23. The depth of the groove end becomes smaller toward its end at an inclination angle of 45°. Instead of a single groove 24, several grooves 24 may be provided in the inner wall 23. The grooves may also extend spirally along the inner wall 23 of the cylinder housing 22.

The piston rod seal 62 includes an axially outer support ring 63 and an inner sealing lip 64. It forms a passage 61 for the piston rod. The support ring 63 is in non-sealing contact with the piston rod 42. The axially outwardly facing sealing lip 64 extends around the piston rod 42 and seals the cylinder interior 25 hermetically against the ambient 1 when the piston is disposed in the cylinder space 25 as shown in FIG. 1. A non-sealing engagement ring 66 is provided on the piston rod oriented toward the inner cylinder space 25.

The piston 51 and the piston rod 42 of the piston unit 41 are interconnected for example in a form- and material-locking manner; they may be cemented together.

The overall length of the piston unit 41 is for example 5% greater than the length of the cylinder 21. The cross-sectional area of the piston rod 42 which may consist of a plastic is in the shown embodiment one eighths of the inner cross-sectional area of the cylinder 21 at the cylinder head section 29. The piston rod 42 may be bendable.

The two piston sealing elements 71, 72 are arranged between an engagement shoulder 45 of the piston unit 41 and an annular sleeve collar 56 oriented toward the displacement space 15. The first piston sealing element 71 is in a streamlined form. It is disposed with an engagement area 73 firmly engaged between the piston rod 42 and the piston 51. Adjacent this engagement area 73 an at least essentially cylindrical sleeve shaped sleeve-like area 74 is provided which forms a deformation area 74. An inwardly projecting annular support ring 75 forms the axial end of this piston sealing element 71 in the axial direction 19. This support ring 75 is accommodated in a circumferential piston groove 52.

In the representation of FIG. 4, the second sealing element 72 is arranged spaced from the first sealing element 71 in the piston groove 52. The second sealing ring is a shaft seal ring 72 which has a recess facing the displacement space 15 and which includes an outer circumferential seal collar 76. The piston seal elements 71, 72 consist for example of nitril-butadiene-caoutchouc provided with a halogenized surface. The two piston sealing elements 71, 72 may also be in the form of an integral component. The overall length of the unbiased spaced piston sealing elements 71, 72 is designated below as the maximum length of the piston seal elements 71, 72.

The piston 51 has in the area of the piston groove 52 two opposite longitudinal grooves 53 which extend to the sleeve collar 56. These axial grooves 53 provide for communication between the pressure space 17 of the first piston sealing element 71 and the displacement space 15.

The piston rod 42 is provided in a section 46 of its outer surface 47 adjacent the engagement shoulder 45 with longitudinal passages 48. The length of these passages 48 which may be evenly distributed over the circumference of the piston rod corresponds for example to the thickness of the rod seal 62 in a direction parallel to the piston rod 42. The length of the at least one longitudinal passage 48 corresponds for example to the length of the seal lip 64 inclusive its area 65 which does not abut the piston rod. The longitudinal passage 48 in the direction toward the piston rod head 43 however extends beyond the sealing lip 64. Its depth is for example 3% of the diameter of the piston rod 42; its width is 16% of the piston rod diameter. The overall cross-sectional area of the longitudinal passages 48 is consequently 5% of the piston rod cross-section.

Instead of the longitudinal passage 48 described above the piston rod 42 may also be provided with spirally extending passages 48. Those may extend around the piston rod all in the same sense or in an opposite sense, that is they may intersect etc.

In the exemplary embodiment, in the longitudinal direction 19 of the deceleration device 10, the distance of the sealing lip 64 of the rod seal 62 is, at the beginning of the groove 24 in the cylinder wall 23, longer by 3 mm than the distance of the beginning of the longitudinal passage 48 from the displacement space side of the seal collar 76 of the second piston seal element 72. The last-mentioned length is the sum of the length of the longitudinal passage 48, the length of a transition area 44 between the longitudinal channels 48 and the piston seal elements 71, 72 as well as the maximum length of all piston seal elements 71, 72.

After assembly, in the presented exemplary embodiment the piston 51 and the cylinder bottom end wall 28 delimit the displacement space 15. The piston 51 and the cylinder head section 29 delimit a compensation chamber 16. The piston sealing element 71 and the piston 51 delimit now a pressure chamber 17, which is in communication with displacement space 15 via the longitudinal grooves 53 and the communication passages 57.

When the piston 51 of the deceleration device 10 is extended, see FIGS. 2-4, the piston 51 is disposed in the area of the cylinder 21 with enlarged inner diameter. It is disposed for example in the smooth surface area 26 of the inner cylinder wall 23 which is not provided with any grooves. The seal collar 76 is in contact with the inner cylinder wall 23 in a non-sealing relationship. The sleeve-like deformation area 74 is not expanded so that a radial play is formed between the inner cylinder wall 23 and the piston 51.

With the piston 51 inserted, see FIG. 1, the piston sealing elements 71, 72 abut the inner cylinder wall 23 but do not seal in the area of the axial throttling groove 24. The axial groove 24 provides for a communication path between the displacement space 15 and the compensation chamber 16.

After installation of the deceleration device for example in a furniture piece, possibly in connection with a drawer, the deceleration device 10 is disengaged from the drawer, when the drawer is fully pulled out. The piston unit 51 is then in the extended end position as shown in FIGS. 2-5. In this position, the engagement shoulder 45 may abut the piston rod seal 62. The deceleration device 10 however may also be so designed that, in the extended end position of the piston unit 41, the engagement shoulder 45 is spaced from the piston rod seal 62 for example by 2 to 3 mm. To this end, for example a mechanical stop may be provided on the piston rod 42 without or within the cylinder 21.

For example upon closing of the drawer, in a partial stroke near the closed end position of the drawer, a carrier member engages the piston rod head 43 or an engagement element connected thereto.

The piston rod 42 is then moved into the cylinder by the external force applied thereto. Hereby, the piston 51 is moved from the head section 29, see FIGS. 2-4, toward the cylinder bottom wall 28, see FIG. 1. As a result, the volume of the displacement space 15—in the representation of FIGS. 2 and 4, this volume is at its maximum—is reduced. The gas pressure, for example the air pressure in the displacement space 15 is increased and acts as an internal force on the piston sealing element 71. As a result, immediately after the beginning of the inward movement of the piston rod 42, the seal collar 76 is deformed and pressed against the inner cylinder wall 23. The displacement space 15 and the compensation chamber 16 are quasi-hermetically sealed off from each other. As soon as the sealing lip 64 hats reached the cylindrical section 49 of the piston rod 42 the compensation chamber 16 is sealed against the ambient 1 by means of the piston rod seal 62. With a further insert movement of the piston 51, a vacuum is generated in the compensation chamber 16.

The pressure which is generated in the displacement space 15 is also effective on the inner surface of the deformation sleeve area 74 of the seal element. The sleeve area 74 is curved outwardly and pressed into engagement with the inner surface of the cylinder wall 23.

By the deformation of the sleeve area 74, the sealing element 71 is axially shortened. The support ring 75 moves along the for example truncated cone-shaped piston recess 52 toward the piston rod 42 and, in the process, allows the sleeve deformation area 74 to move further outwardly whereby the braking effect of the deformation sleeve area 71 is increased. The axial grooves and communication passages 53, 57 are not blocked so that the displacement space 15 and the pressure space 17 remain in communication during the whole stroke.

Upon further inward movement of the piston rod 42, the seal collar 76 pressed, onto the inner cylinder wall 23 and the sleeve area 74 abutting the inner cylinder wall 23 cause a high deceleration of the piston stroke movement. The drawer is strongly braked.

Finally, the seal collar 76 of the sealing element 72 disposed on the piston rod 42 reaches the beginning of the axial groove 24 which forms a throttling passage. As soon as the seal collar 76 has passed the edge of the throttling channel 24, air flows out of the displacement space 15 via the throttling channel 24 to the compensation chamber 16, causing the pressure in the displacement space 15 to suddenly drop. At this point, the engagement area 14 of the sealing element 71 may still abut the inner cylinder wall 23. The air volume displaced from the displacement space 15 is greater than the volume by which the compensation chamber 16, into which the piston rod moves during this process, is increased. The pressure in the compensation chamber 16 increases a result. Some air can flow from the compensation chamber 16 via the piston rod seal 62 to the ambient.

When the piston sealing element is completely disengaged from the inner cylinder wall 23, additional air flows from the displacement space 15 to the compensation chamber 16. The piston seal element 71 assumes again its original position it had before the stroke movement. The drawer now has a small residual speed. In the end position, it remains still without rebound.

During deceleration of the drawer, it may be coupled with a final, pull-in structure. This comprises for example a spring by which an additional internal force is applied to the guide structure. It acts on the deceleration device 10 as an external force.

After some time in which the deceleration device 10 has not been activated the pressure in the displacement space 15 and in the compensation chamber 16 will have assumed ambient pressure. There is no danger whatsoever that in the rest position, the deceleration device 10 breaks by an internal vacuum or excess pressure for example as a result of material fatigue.

When the drawer is again pulled out, air flows from, the compensation chamber 16 via the throttling passage 24 into the displacement space 15. The piston sealing element 71 remains essentially undeformed and is not in contact with the inner cylinder wall 23 at least over a large part of the stroke.

Since, during outward movement of the piston air can flow essentially uninhibitedly from the compensation chamber 16 into the displacement space 15, the outward movement occurs essentially without any resistance. During the outward movement of the piston unit 41, the compensation chamber 16 becomes smaller and the displacement space 15 becomes larger. Because of the volume of the piston rod 42, the volume of the displaced air is smaller than the volume by which the displacement space is increased. The air pressure in the displacement space and in the compensation chamber is accordingly reduced.

Shortly before the piston unit 41 reaches the extended end position—the displacement space 15 now has maximum volume—the sealing lip 64 of the piston rod seal 62 reaches the at least one longitudinal passage 48 on the piston 42. At this point, a pneumatic connection is established between the inner cylinder space 25 and the ambient 1. From the ambient, air flows now into the compensation chamber 16 and into the displacement space 15. The air pressure in these spaces corresponds to ambient pressure.

As soon as the piston rod 42 is fully extended, the piston rod side carrier element is released from the furniture-side carrier. The retardation device 10 is no longer connected to the carrier member. The piston rod 42 of the deceleration arrangement 10 is now extended; the pull-in arrangement is released.

For a return of the piston 51, first the one pneumatic connection 18 between the cylinder inner space 25 and the ambient 1 is closed. The sealing lip 64 is moved onto the cylindrical section 49 of the piston rod 42. Only upon further inward movement of the piston unit 4, the seal collar 76 of the sealing element 72 reaches the throttling passage 24 of the inner cylinder wall 23.

As a result, ambient pressure is present in the displacement space 15 at the beginning of each retardation stroke. The deceleration device 10 has therefore a repeatable and constant performance.

Instead of the longitudinal passages 48 on the piston rod 42, the elastically deformable piston rod 42 may be bent in its extended end position out of its straight state. In this way, the piston rod seal 62 is deformed and no longer seals so that for pressure compensation air from the ambient 1 can enter the compensation chamber 16 and the displacement space 15.

It is also possible to open a separate valve when the piston unit 41 is in its extended position. Such a valve could for example be integrated into the piston rod seal 62.

The deceleration device 10 may also be constructed in such a way that the displacement space 15 is arranged between the piston 51 and the piston rod seal 62. The piston rod 42 then extends through the displacement space 15. The compensation chamber 16 then is arranged between the piston 51 and the cylinder bottom wall 28.

In such a deceleration device 10, the deceleration occurs during an extension of the piston rod 42. The grooveless area of the inner cylinder wall 23 is disposed adjacent the cylinder bottom wall. In such an embodiment, the longitudinal passages 48 are arranged for example near the piston rod head 43. Also, in this embodiment, the piston rod 42 could be deformed or a valve could be provided in the piston rod seal 62 in order to establish in the end position of the piston unit 41 a pneumatic connection 18 between the displacement space 15 and the ambient 1.

The deceleration device 10 as described herein may be part of a guide system.

REFERENCE LIST

| | |
|---|---|
| 1 | Ambient |
| 10 | Deceleration device |
| 15 | Displacement space |
| 16 | Compensation chamber |
| 17 | Pressure space |
| 18 | Pneumatic connection |
| 19 | Longitudinal direction |
| 21 | Cylinder |
| 22 | Cylinder sleeve |
| 23 | Internal cylinder wall |
| 24 | Axial groove, throttling passage |
| 25 | Inner cylinder space |
| 26 | Smooth, groove-free surface area |
| 28 | Bottom end wall |
| 29 | Head section |
| 31 | Projection |
| 32 | Front end face |

-continued

| | |
|---|---|
| 33 | Annular chamber |
| 41 | Piston unit |
| 42 | Piston rod |
| 43 | Rod head |
| 44 | Transition area |
| 45 | Engagement shoulder |
| 46 | Section of piston rod 42 |
| 47 | Outer surface |
| 48 | Longitudinal passages |
| 49 | Cylinder section of 42 |
| 51 | Piston |
| 52 | Piston groove |
| 53 | Axial groove |
| 56 | Sleeve collar |
| 57 | Communication passages |
| 61 | Piston rod passage |
| 62 | Rod seal |
| 63 | Support ring |
| 64 | Sealing lip |
| 65 | Seal lip area not in contact with rod |
| 66 | Engagement ring |
| 71 | Sealing element |
| 72 | Sealing element |
| 73 | Engagement area |
| 74 | Deformation area |
| 75 | Support ring |
| 76 | Seal collar |

What is claimed is:

1. A pneumatic deceleration device (10) comprising
a cylinder (21),
a piston (51) movably disposed in the cylinder (21) and having a piston rod (42) with a piston rod head (43) for guiding the piston,
a piston cod sealing element (62) disposed at one end of the cylinder (21) so as to extend around the piston rod (42) and pointing toward the piston rod head (43),
piston sealing elements (71, 72) disposed on the piston and defining in the cylinder,
a displacement space (15) at one side of the piston (51) and a compensation chamber (16) at the opposite side of the piston, wherein, by a pressure in the displacement space (15) and a vacuum in the compensation chamber (16), a force acting on the piston (51) is established in opposition to a stroke movement of the piston (51), with a leakage flow between the displacement space (15) and the compensation chamber (16) being permitted depending on the stroke direction of the piston, so that, during an initial pressure built up in the displacement space (15) and a vacuum build-up in the compensation chamber (16), the compensation chamber (16) is hermetically isolated from the displacement space (15),
said deceleration device (10) including further a pneumatic connection (18) providing in an end position of the piston, in which the displacement space (15) is largest, for a blockable communication path (18) of the displacement space (15) and of the compensation chamber (16) with the ambient and, with the communication path (18) being blocked upon movement of the piston rod (42) with the piston (51) into the cylinder (21), the compensation chamber (16) being sealed into the cylinder (21), the compensation chamber (16) being sealed for generating the vacuum in the compensation chamber (16).

2. The pneumatic deceleration device (10) according to claim 1, wherein the piston rod seal (62) comprises a single lip seal (64) facing toward a piston rod end head (43).

3. The pneumatic deceleration device (10) according to claim 2, wherein the pneumatic connection (18) is formed by a longitudinal passage (48) disposed in the piston rod (42).

4. The pneumatic deceleration device (10) according to claim 3, wherein the length of the longitudinal passage (48) is shorter than 8% of the piston stroke.

5. The pneumatic deceleration device (10) according to claim 3, wherein the cylinder (21) has an internal cylinder wall (23) with a longitudinal groove (24) extending in the axial direction (19), with the length of the longitudinal groove (24) being not more than 90% of the length of the cylinder (21) and the piston (51) being disposed in its end position in which the displacement space (15) is at its maximum in a groove-free area (26) of the inner cylinder wall (23).

6. The pneumatic deceleration device (10) according to claim 5, wherein a sum of the length of the longitudinal passage (48) formed in the piston rod (42), a maximum length of the piston sealing elements (71, 72) and a length of a transition area (44) between the longitudinal passage (48) and the piston sealing elements (71, 72) is shorter than a distance of the single lip seal (64) of the piston rod sealing element (62) from the displacement space-side end of the groove free area (26) of the inner wall (23) of the cylinder (21) as measured in the longitudinal direction (19).

* * * * *